(12) United States Patent
Mordukhovich et al.

(10) Patent No.: US 8,196,559 B2
(45) Date of Patent: Jun. 12, 2012

(54) METHOD AND APPARATUS TO REMOVE A FLUIDIC CONTAMINANT FROM LUBRICATING OIL

(75) Inventors: Gregory Mordukhovich, Bloomfield Hills, MI (US); James L. Linden, Rochester Hills, MI (US); Andrew M. Mance, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 442 days.

(21) Appl. No.: 12/578,798

(22) Filed: Oct. 14, 2009

(65) Prior Publication Data

US 2011/0083650 A1    Apr. 14, 2011

(51) Int. Cl.
*F01M 11/03*   (2006.01)
*F02B 25/06*   (2006.01)
*C02F 1/00*    (2006.01)

(52) U.S. Cl. ............... 123/196 A; 123/572; 210/167.01
(58) Field of Classification Search .................. None
See application file for complete search history.

(56) References Cited

U.S. PATENT DOCUMENTS

| | | | | |
|---|---|---|---|---|
| 1,955,822 | A  * | 4/1934 | Mckinley | 123/196 A |
| 6,161,529 | A  * | 12/2000 | Burgess | 123/572 |
| 6,557,533 | B2 * | 5/2003 | Katayama et al. | 123/516 |
| 6,810,861 | B2 * | 11/2004 | Itakura et al. | 123/516 |
| 7,028,673 | B2 * | 4/2006 | Itou et al. | 123/516 |
| 7,543,573 | B2 * | 6/2009 | Olree | 123/518 |
| 2006/0236984 | A1 * | 10/2006 | Reddy | 123/518 |
| 2009/0126700 | A1 * | 5/2009 | Weller | 123/518 |
| 2009/0196968 | A1 * | 8/2009 | Bratton et al. | 426/417 |
| 2011/0062082 | A1 * | 3/2011 | Mordukhovich et al. | 210/651 |
| 2011/0083650 | A1 * | 4/2011 | Mordukhovich et al. | 123/573 |
| 2011/0083651 | A1 * | 4/2011 | Mordukhovich et al. | 123/573 |
| 2011/0084010 | A1 * | 4/2011 | Mordukhovich et al. | 210/167.04 |

* cited by examiner

*Primary Examiner* — Marguerite McMahon
*Assistant Examiner* — Tea Bajramovic

(57) ABSTRACT

A device for removing a fluidic contaminant from lubricating oil in an internal combustion engine includes a fluid absorbing element comprising a mounting element and a fluid absorption media assembled into a sump of a crankcase of the internal combustion engine. The fluid absorbing element is immersed within the oil contained in the sump when the engine is not operating. The fluid absorption media is configured to absorb a fluidic contaminant in the engine oil when the engine is not operating and to desorb the absorbed fluidic contaminant.

10 Claims, 1 Drawing Sheet

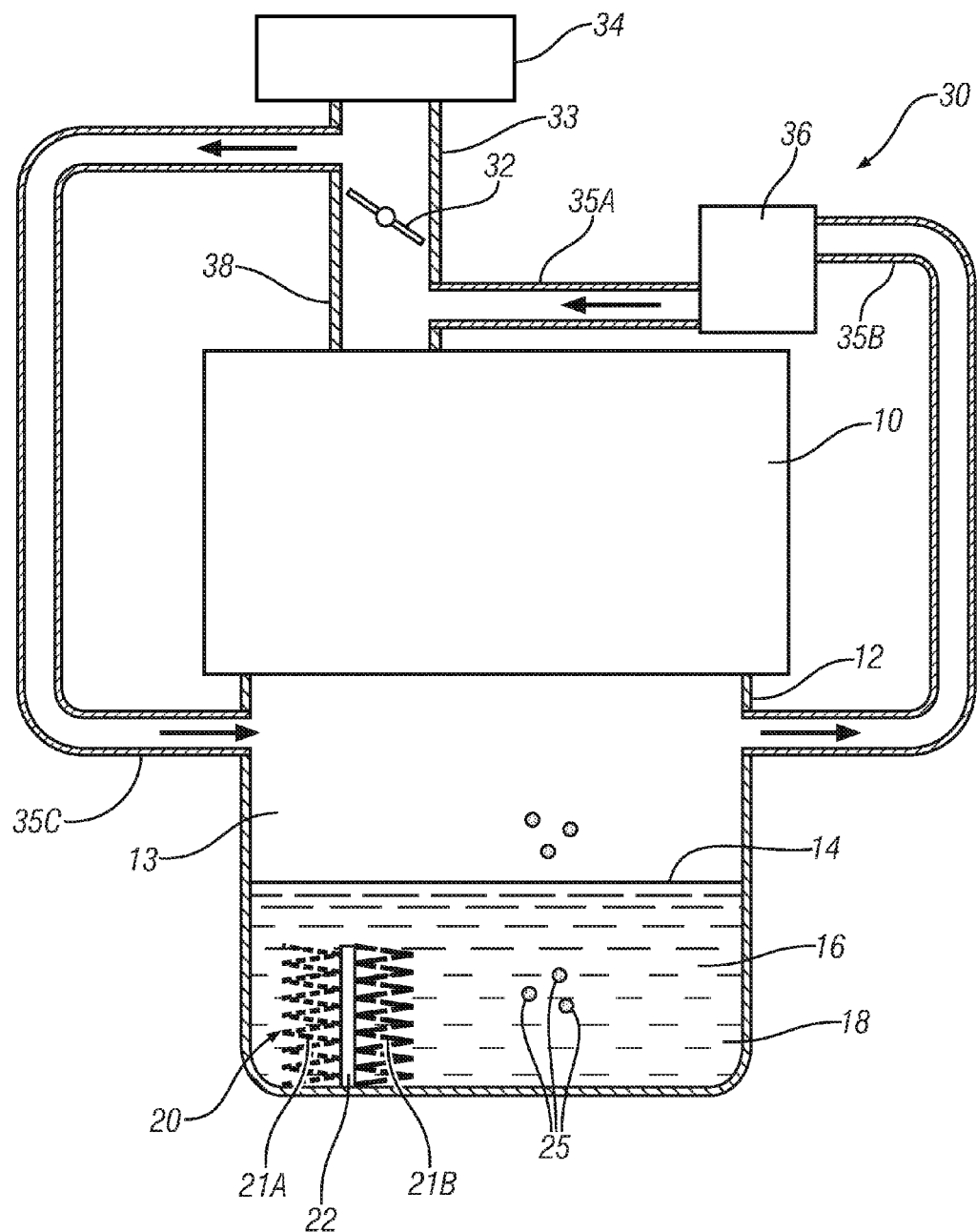

METHOD AND APPARATUS TO REMOVE A FLUIDIC CONTAMINANT FROM LUBRICATING OIL

TECHNICAL FIELD

This disclosure is related to an internal combustion engine and associated oil lubricating system.

BACKGROUND

The statements in this section merely provide background information related to the present disclosure and may not constitute prior art.

Combustion in internal combustion engine systems generates combustion gases, a portion of which can be forced passed engine pistons to an engine crankcase, in a process referred to as blow-by. Combustion gases that blow-by pistons end up in the engine crankcase. A portion of the combustion gases in the engine crankcase can be recirculated into the engine intake system via a crankcase ventilation process, whereby they are burned during combustion. A portion of the combustion gases in the engine crankcase can precipitate and be absorbed into the engine oil, thus affecting lubricity of the engine oil and reducing service life of the engine oil. The condensed combustion gases contained in crankcase oil can include fluidic contaminants in the form of unburned fuel and combustion components, e.g., hydrocarbons, alcohols (ethanol and methanol), and water. Presence and concentrations of fluidic contaminants can affect lubricity and service life of engine oil.

Known oil filter devices remove solid contaminants from engine oil prior to circulating the engine oil to engine components including crankshaft bearings, camshaft bearings, lifters, and pistons. Engine systems include oil pumps that pump pressurized oil through the oil filter device. Known engine oil filter devices include prefiltering elements including mesh stainless steel screens to remove large solid contaminants. Known engine oil filters include filtering elements including cotton fibrous filter elements to remove smaller solid contaminants. Known engine oil filters include magnetized elements for removing ferrous particles contained in the oil.

SUMMARY

A device for removing a fluidic contaminant from lubricating oil in an internal combustion engine includes a fluid absorbing element comprising a mounting element and a fluid absorption media assembled into a sump of a crankcase of the internal combustion engine. The fluid absorbing element is immersed within the oil contained in the sump when the engine is not operating. The fluid absorption media is configured to absorb a fluidic contaminant in the engine oil when the engine is not operating and to desorb the absorbed fluidic contaminant.

BRIEF DESCRIPTION OF THE DRAWING

One or more embodiments will now be described, by way of example, with reference to the accompanying FIGURE, which is a two-dimensional schematic diagram in accordance with the present disclosure.

DETAILED DESCRIPTION

Referring now to the FIGURE, the showings are for the purpose of illustrating certain exemplary embodiments only and not for the purpose of limiting the same. The FIGURE schematically illustrates an embodiment of an absorbing element 20 configured to absorb a fluidic contaminant 25 in engine oil 16 in a crankcase 12 of an internal combustion engine 10. The fluidic contaminant 25 is depicted as a single element, and can include one or more of hydrocarbons, alcohols, e.g., ethanol and methanol, and water. The absorbing element 20 is preferably assembled into a sump 18 of the crankcase 12 and is completely immersed in the engine oil 16. Alternatively, the absorbing element 20 is assembled into a sump of a fluid reservoir associated with a transmission device to effect absorption of fluidic contaminants in transmission fluid. Alternatively, the absorbing element 20 is assembled into a sump of a fluid reservoir associated with a driveline differential to effect absorption of fluidic contaminants in gear oil. Like numerals refer to like elements in the various embodiments.

The internal combustion engine 10 includes the crankcase 12, a throttle 32, air filtering system 34, intake plenum 38, and a positive crankcase ventilation (PCV) system 30. The crankcase 12 includes a sump 18 for capturing engine oil 16 during engine operation and a head space 13 that is above an oil level 14. The oil level 14 as shown depicts the level of oil 16 in the crankcase 12 subsequent to discontinuing operation of the engine 10 and permitting excess oil to drain from various locations in the engine 10 into the crankcase 12. A skilled practitioner understands that the oil level 14 varies, including decreasing during operation of the engine 10 as a result of oil 16 being pumped through an oil filter to lubricate various locations in the engine.

The PCV system 30 includes a first conduit 35A that fluidly connects the intake plenum 38 and a PCV valve 36, a second conduit 35B that fluidly connects the PCV valve 36 and the head space 13 of the crankcase 12, and a third conduit 35C that fluidly connects an air duct 33 between the air filtering system 34 and the throttle 32 to the head space 13 of the crankcase 12. Operation of the PCV system 30 is as follows. During engine operation, vacuum generated in the plenum 38 associated with operation of the engine 10 creates a flow path through the first conduit 35A to the PCV valve 36, through the second conduit 35B to the head space 13 of the crankcase 12, through the third conduit 35C to the air duct 33 between the air filtering system 34 and the throttle 32. In this operation, gases in the head space 13 are drawn into the intake plenum 38 to be combusted during engine operation, and filtered intake air is circulated into the head space 13 to displace the gases therein.

The absorbing element 20 includes a unitary piece of a fluid absorption media 21 that is preferably fixedly attached to a mounting element 22, e.g., a piece of aluminum that is attached to the crankcase 12. As shown, there is a first fluid absorption media 21A and a second fluid absorption media 21B. Each of the first fluid absorption media 21A and the second fluid absorption media 21B is preferably associated with a single one of the fluidic contaminants 25 described herein. The absorbing element 20 including the first and second fluid absorption media 21A and 21B is completely immersed within the oil 16 contained in the sump 18 when the engine 10 is not operating. Each fluid absorption media 21, e.g., 21A and 21B, is configured to absorb different fluidic contaminants 25 from the engine oil 16, preferably during a period when the engine 10 is not operating, including those resulting from in-cylinder combustion and cylinder blow-by. In one embodiment, the first absorption media 21A can absorb a first fluidic contaminant 25, e.g., water, and the second absorption media 21B can absorb a second fluidic contaminant, e.g., alcohol.

During engine operation, oil contaminants including one or more fluidic contaminants 25 can be introduced into the engine oil 16. The fluidic contaminant 25 may be in a gaseous or aerosol form when entering the head space 13 of the crankcase 12. For purposes of the disclosure, a fluidic contaminant 25 is a non-oil element that precipitates to a liquid form at ambient temperatures, e.g., between 50° C. and 0° C. One or more fluidic contaminants 25 may be found in the crankcase 12. The fluidic contaminants 25 include fuel and combustion components, including, e.g., hydrocarbon fuels, alcohols (ethanol and methanol), and water. Fluidic contaminants 25 can pass engine piston rings during combustion. When not operating, the engine 10 loses heat and cools to ambient temperatures. Oil drains out of oil galleys to the crankcase 12. The fluidic contaminants 25 present in the head space 13 of the crankcase 12 condense and mix with engine oil 16 in the crankcase 12.

During subsequent operation of the engine 10, when the temperature of the engine oil 16 exceeds a predetermined temperature associated with the specific fluidic contaminant 25 absorbed on the fluid absorption media 21, the absorbed fluidic contaminant 25 evaporates off the fluid absorption media 21 and becomes airborne in the crankcase 12. The predetermined temperature associated with the fluidic contaminant 25 is associated with the evaporative temperature of the fluidic contaminant 25. Thus, when the fluidic contaminant 25 is water, when the temperature of the engine oil 16 reaches the evaporative temperature of 100° C. under standard conditions, the water evaporates and is ejected into the head space 13 of the crankcase 12, where it can be circulated into the intake plenum 38 by way of the PCV system 30 and expelled through the engine exhaust.

Thus, when the fluidic contaminant 25 is alcohol, e.g., either ethanol or methanol, when the temperature of the engine oil 16 reaches the evaporative temperature of 79° C. under standard conditions, the alcohol evaporates and is ejected into the head space 13 of the crankcase 12, where it can be circulated into the intake plenum 38 by way of the PCV system 30 and burned during combustion.

Thus, when the fluidic contaminant 25 is hydrocarbon fuel, when the temperature of the engine oil 16 reaches the evaporative temperature of the specific hydrocarbon, the fuel evaporates and is ejected into the head space 13 of the crankcase 12, where it can be circulated into the intake plenum 38 by way of the PCV system 30 and burned during combustion.

The absorption media 21 removes one of the fluidic contaminants 25 from the lubricating oil. The absorption media 21 preferably includes absorption media including cellulose fiber, silica gel and/or aluminum oxide disbursed on a substrate and installed as has been described. Exemplary silica gel has a particle size range between 75 and 250 microns (Mesh 200-60). One example volume of the silica gel is 4 g. Exemplary aluminum oxide has a particle size range between 75 and 250 microns (Mesh 200-60). An example volume of the aluminum oxide is 4 g. In one embodiment, the filtering element can include a cellulose fiber substrate having one of aluminum oxide and silica gel disbursed thereon.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device for removing a fluidic contaminant from lubricating oil in an internal combustion engine, comprising:
    a fluid absorbing element comprising a mounting element and a fluid absorption media assembled into a sump of a crankcase of the internal combustion engine,
    the fluid absorbing element immersed within the oil contained in the sump when the engine is not operating;
    the fluid absorption media configured to absorb a fluidic contaminant in the engine oil when the engine is not operating; and
    the fluid absorption media configured to desorb the absorbed fluidic contaminant.

2. The device of claim 1, wherein the fluid absorption media is configured to desorb the absorbed fluidic contaminant when the engine is operating.

3. The device of claim 2, wherein the absorbed fluidic contaminant desorbs when the engine oil achieves an evaporative temperature of the absorbed fluidic contaminant.

4. The device of claim 2, further comprising the engine including a positive crankcase ventilation system configured to circulate the desorbed fluidic contaminant into an intake system of the engine when the engine is operating.

5. The device of claim 1, wherein the fluid absorption media comprises silica.

6. The device of claim 1, wherein the fluid absorption media comprises alumina.

7. A method for removing a fluidic contaminant from engine oil in an internal combustion engine, comprising:
    assembling a fluid absorbing element into a sump of a crankcase of the internal combustion engine, the fluid absorbing element immersed in the engine oil contained in the sump when the engine is not operating;
    absorbing a fluidic contaminant in the engine oil onto the fluid absorbing element; and
    desorbing the absorbed fluidic contaminant contained on the fluid absorbing element.

8. The method of claim 7, comprising absorbing the fluidic contaminant in the engine oil onto the fluid absorbing element during a period when the engine is not operating.

9. The method of claim 7, comprising desorbing the absorbed fluidic contaminant from the fluid absorbing element when the engine is operating.

10. The method of claim 9, wherein desorbing the absorbed fluidic contaminant from the fluid absorbing element when the engine is operating further comprises circulating the desorbed fluidic contaminant into an intake system of the engine using a positive crankcase ventilation system.

* * * * *